United States Patent [19]

Krumbe et al.

[11] Patent Number: 5,108,732

[45] Date of Patent: Apr. 28, 1992

[54] PROCESS FOR THE PREPARATION OF FINELY DIVIDED CERAMIC OXIDE POWDERS FROM PRECURSOR COMPOUNDS

[75] Inventors: Wolgang Krumbe; Benno Laubach, both of Krefeld, Fed. Rep. of Germany

[73] Assignee: Bayer Aktiengesellschaft, Leverkusen, Fed. Rep. of Germany

[21] Appl. No.: 603,284

[22] Filed: Oct. 25, 1990

[30] Foreign Application Priority Data

Dec. 2, 1989 [DE] Fed. Rep. of Germany ....... 3939953

[51] Int. Cl.$^5$ .................................................. C01G 1/02
[52] U.S. Cl. .................................. 423/592; 423/606; 423/607; 423/608; 423/609; 423/610; 423/611; 423/612; 423/617; 423/618; 423/624; 423/625
[58] Field of Search ............... 423/592, 606, 607, 608, 423/609, 610, 611, 612, 617, 618, 624, 625

[56] References Cited

U.S. PATENT DOCUMENTS

| | | | |
|---|---|---|---|
| 4,741,894 | 5/1988 | Melas | 423/608 |
| 4,923,682 | 5/1990 | Roberts et al. | 423/611 |
| 4,990,474 | 2/1991 | Castellano | 423/612 |

FOREIGN PATENT DOCUMENTS

| | | | |
|---|---|---|---|
| 0286155 | 10/1988 | European Pat. Off. | 423/608 |
| 0314166 | 3/1989 | European Pat. Off. | |
| 2628664 | 9/1989 | France . | |
| 62-226816 | 10/1987 | Japan | 423/608 |

OTHER PUBLICATIONS

Patent Abstracts of Japan, Apr. 28, 1983, 100 (C-164)(1245); JP-A-5826006 (Showa Denko KK), Feb. 16, 1983.

Patent Abstracts of Japan, 203 (C-360)(2259) Jul. 16, 1986; & JP A-6144711 (Agency of Ind. Sci. & Technol.), Mar. 4, 1986.

Patent Abstracts of Japan, 94(C-388)(2151), Apr. 11, 1986; & JP A-60226408 (Kogyo Gijutsuin) Nov. 11, 1985.

*Primary Examiner*—William R. Dixon, Jr.
*Assistant Examiner*—Anthony J. Green
*Attorney, Agent, or Firm*—Connolly & Hutz

[57] ABSTRACT

A process for preparing finely-divided oxides of metals of metalloids of the elements of main groups III and IV and sub-groups III, IV, V and VI of the Periodic System of Elements, comprising reacting compounds of these elements with a polymerizable hydrocarbon compound or mixture to form a polymer product, which is then thermally treated to yield the oxide product.

12 Claims, No Drawings

PROCESS FOR THE PREPARATION OF FINELY DIVIDED CERAMIC OXIDE POWDERS FROM PRECURSOR COMPOUNDS

The present invention relates to a process for the preparation of finely divided oxides of metals or metalloids of the elements of Main Groups III and IV and Sub-Groups III, IV, V and VI of the Periodic System of Elements from the corresponding halides, alkoxides, oxyhalides or halogenated organyl silanes by reacting these with polymerisable compounds containing hydrocarbons to produce the polymer which is then thermally decomposed to the corresponding oxides.

Ceramic moulded articles are generally produced by sintering finely divided powders. These powders should not only be in a very pure state to improve the material properties but should also be in a state of very fine subdivision and hence have a high BET for improving the sintering activity at low temperatures.

In the preparation of oxides of metals or metalloids as ceramic starting materials, various procedures are employed for obtaining finely divided, very pure products with high specific surface areas.

The Andritz-Ruthner spray roasting process, DE-A 2 525 929, employs metal or metalloid halide solutions which are thermally decomposed in the presence of steam at 300° to 950° C. by a so-called pyrohydrolysis to produce the finely divided oxides or mixed oxides.

The oxides prepared by this process and by the flame hydrolysis process, Angewandte Chemie 72, 19/20, 744 to 750 (1960) have, however, unacceptably high halide contents which limit the use of the powders obtained.

Other processes employ aluminium salts which are purified by time-consuming and cost intensive processes of multiple recrystallisation before being thermally decomposed for the preparation of finely divided, highly pure $Al_2O_3$.

Other known processes include pyrolysis or hydrolysis of the high cost metal alkoxides, followed by drying. The problem of the hydrolysis process, apart from the high cost of the starting materials, is the wide range of particle sizes of the hydrolysis particles due to the processes of nucleation and growth. Considerable formation of agglomerates takes place in the subsequent drying stages, particularly when the oxides are prepared from the hydroxides by tempering.

EP-A 0 314 166 describes a process of hydrolysis in which the oxides or hydroxides are prepared by the reaction of hydrolysable compounds with water in an organic solvent in the presence of a chelating agent such as ethyl acetoacetate.

The problem of this process is that growth of the hydrolysis particles is accompanied by agglomeration which must be prevented by the addition of the required quantity of stabilizer to stabilize the suspension.

After isolation of the hydrolysis particles, however, agglomerates are formed in the drying process, as described above, and these must be broken down by a vigorous grinding operation.

It is an object of the present invention to provide a process which enables finely divided oxide powders of a high degree of purity and with a high specific surface area to be produced from inexpensive raw materials.

A process has now surprisingly been found which fulfils these requirements and in which the oxides are produced without cost intensive steps of hydrolysis.

In this process, the metal halide or metalloid halide reacts spontaneously with a polymerisable C—OH—functional compound or with a mixture of such compounds which are thereby polymerised to a ceramic M—O—C— containing preliminary product which can be converted into the required highly pure, refractory metal compound or metalloid compound by a simple heat treatment.

This invention thus relates to a process for the preparation of monodisperse oxides of metals and/or metalloids of elements of the main groups III and IV (groups IIIA and IVA) and sub-Groups III, IV, V and VI (groups IIIB, IVB, VB and VIB) of the Periodic System of elements from compounds of the formulae $MX_m$ and/or $R_nMX_{m-n}$ and/or $MO_pX_{m-2p}$, wherein X denotes a halogen or alkoxy group and R denotes hydrogen, alkyl or aryl and n may assume the value of an integer from 1 to one less than the maximum valency m the element M and p=1 or 2 such that $m-2p \geq 1$, by reaction of the compounds or mixtures of compounds with a reactive, polymerisable, hydrocarbon-containing compound containing a C—OH group and/or with a reactive mixture of hydrocarbon-containing, polymerisable compounds of which one compound contains a C—OH group, followed by thermal decomposition of the resulting product in an oxidizing atmosphere to form the corresponding oxides.

The process according to the invention gives rise to a polymeric product which is obtained either as a black powder or as a black, brittle solid, depending on the metal compound or metalloid compound used. If the process is carried out under suitable conditions, a molecular disperse distribution of the compounds in the ceramic precursor product is obtained. A finely divided, oxidic ceramic powder having a high specific surface area may then be obtained by the subsequent thermal decomposition.

The temperature treatment is carried out in an oxidizing atmosphere in the presence of air, oxygen or mixtures thereof and mixtures of nitrogen and oxygen. The heat may be applied by direct heating with suitable gas burners or indirectly in a static or moving bed. When moving systems are employed, e.g. rotary tubular furnaces, granulation of the pulverulent polymeric products may be necessary to reduce the amount of dust produced. If specific temperature limits are observed for each particular element and the correct heating time is employed, the compound specific modifications can easily be obtained with the required fineness of subdivision.

It is surprising to find that in contrast to the calcination of metal compounds or metalloid compounds described in the literature for the preparation of oxide powders, the products have an extremely fine state of subdivision. This is probably due to the hitherto unexplained structure of the polymeric precursor and the decomposition behaviour resulting therefrom. The results indicate that the process according to the invention may lead to a molecular disperse distribution of the above mentioned compounds in the polymeric precursor product, which is an advantage, in particular for the preparation of the mixed oxides. The introduction of sintering additives and their homogeneous distribution in the precursor product itself can be achieved without an additional working step. Carbon is formed during the subsequent calcination but is almost completely removed by oxidation. A finely divided oxide powder with a high specific surface area is the result.

During the temperature treatment, the carbon originally formed prevents premature agglomeration of the oxide particles in the process of formation, with the result that the particle size is limited. When the temperature is subsequently further raised, the carbon can be almost completely removed by oxidation.

The reactive mixture of hydrocarbon-containing compounds used may be, for example, a mixture of phenol or phenol derivatives with formaldehyde. Polymerisation in this example proceeds as an acid catalysed polycondensation reaction.

The hydrocarbon-containing compound used may also be a polycondensable monohydroxy compound or a derivative thereof, preferably furfuryl alcohol or a derivative thereof. On the addition of acid, furfuryl alcohol reacts spontaneously to undergo polycondensation or it may undergo vigorous decomposition with evolution of fumes, depending on the quantity and strength of acid added.

In order to keep the quantity of hydrocarbon compound low, it is advisable to use aromatic compounds such as those mentioned above or mixtures thereof since these are found to contain large residues of carbon after polymerisation, as a result of thermal decomposition.

The metals and/or metalloids used are preferably Ti, Hf, Zr, V, Nb, Ta, Cr, Mo and/or W and the main group elements B, Al and/or Si in the form of compounds of the formula $MX_m$ or $MO_pX_{m-2p}$, where X denotes an alkoxy group or a halide such as chloride or bromide and $p=1$ or 2 and $m-2p \geq 1$, m being the valency stage of the element M. These are compounds which can easily be prepared with a high degree of purity. Chlorides such as $ZrOCl_2$, $AlCl_3$, $TiCl_4$ or $BCl_3$ are preferred for economical reasons.

The metal-organyl compound is preferably a compound or mixture of compounds of the formula $R_nMX_{m-n}$ wherein R denotes hydrogen and/or an alkyl and/or aryl group and n may assume the value of an integer from 1 to one less than the valency m of the element M. R may denote either hydrogen or preferentially, identical or different $C_1$ to $C_6$ groups, in particular methyl or phenyl groups. These compounds may easily be highly purified by distillation. Mixtures of compounds of the formula $R_nMX_{m-n}$ with one another, or with compounds of the formula $MX_m$, may in principle also be used, but this procedure is not found to have any positive influence on the quality of the product or on the ease of carrying out the process and is therefore only indicated when such mixtures are obtained in the process of synthesis, in which case their use eliminates the cost of distillative separation.

The functional group X of the compound $R_nMX_{m-n}$ is preferably a chloride on account of its low cost, as in the compounds $CH_3SiCl_3$, $(CH_3)_2SiCl_2$, $(CH_3)_2HSiCl$ and $CH_3HSiCl_2$. Another advantage of using halides is that by virtue of their catalytic action as strong Lewis acids, they give rise to spontaneous polymerisation in many of the reactive mixtures. If the metal or metalloid compound is not a strong Lewis acid or if the reactive organic compound cannot undergo acid catalysed polymerisation, then, according to the invention, the reaction of the compounds to form a polymeric product is brought about by the addition of a catalytic quantity of acid or by the addition of another polymerisation catalyst to the compounds.

The reaction of the compounds to form the desired polymeric product is advantageously carried out in a solvent since this simplifies the process. Although the reaction may in principle be carried out without solvent, this may give rise to difficulties in attempts to prepare a homogeneous mixture of the starting components or it may cause problems in the removal of the heat of the process. Solvents such as toluene, chlorobenzene, acetone and methylene chloride not only enable the reactants to be easily converted into a homogeneous mixture by stirring but also enable the heat of the process to be easily removed by evaporation of the solvent.

The speed of the reaction depends on the concentration of starting compounds, their reactivity and the temperature. When, for example, $AlCl_3$, furfuryl alcohol and chlorobenzene is used as solvent, the reaction, including the polycondensation, is terminated immediately after mixing of the components at room temperature, regardless of the diluent used.

One of the advantages of the process according to the invention, in contrast to the state of the art described above, is that the precursor product is obtained with a molecular disperse distribution of the elements M—O—C and not, as in the process of hydrolysis described, with the formation of hard agglomerates which are difficult to break down. The rapid acid catalysed polymerisation leads to highly cross-linked polymers which have a high coking residue and which after removal of the solvent are frequently obtained as brownish black powders or brittle solids. They are not fusible and therefore can easily by pyrolysed.

The polymeric product containing metals and/or metalloids is heated at temperatures of up to 2000° C., preferably 1200° C., in an oxidizing atmosphere of air, oxygen or steam or mixtures thereof.

Decomposition generally proceeds in several stages, the actual cracking process starting at 300° C. with evolution of gas. Before that temperature is reached, HCl, $H_2O$, alcohol or residues of solvent may escape, depending on the starting compounds used.

Elimination of the carbon formed as a result of decomposition of the polymer begins at temperatures above 500° C.

Above 800° C., the oxides are virtually carbon-free. A temperature treatment above this temperature may become necessary, for example for producing the desired modification of a compound ($\alpha$-, $\beta$, $\gamma$-phase) or for adjusting the specific surface area to the required value.

The oxides prepared at this stage of pyrolysis are finely divided, pulverulent solids with high specific surface areas. They may be amorphous or crystalline, depending on the temperature treatment employed.

The loose agglomerates which may form under certain process conditions can easily be broken down.

The process according to the invention thus provides finely divided, sintering active powders of a high degree of chemical purity and high specific surface area.

By virtue of these properties, the powders are particularly advantageous for use as starting materials for the preparation of sintered moulded articles.

The invention will now be described in more detail with the aid of the following Examples which, however, are not to be regarded as limiting the invention.

EXAMPLE 1

A solution of 2 mol of $AlCl_3$ (266.7 g), 2 l of chlorobenzene and 150 ml of acetone was prepared in a 6-l vessel with stirring and under nitrogen.

A mixture of 197 g of furfuryl alcohol and 1 l of chlorobenzene was added dropwise to this solution within 70 minutes. Formation of Al-containing polymer took place with black colouration and heating of the reaction mixture. Stirring of the reaction mixture was then continued for 2 hours.

The polymeric intermediate product was isolated by the removal of chlorobenzene by distillation at 130° C. and was obtained as a finely divided, black powder weighing 479.2 g. It had a specific surface area of 217 m$^2$/g (BET one point measurement).

21.6 g of the polymeric intermediate product were heated to 900° C. within 2 hours in a quartz glass crucible in the presence of air in a chamber furnace and kept at 900° C. for 12 hours. 4.6 g of a finely pulverulent, white residue were obtained on cooling.

The X-ray diffraction pattern showed the reflections of crystalline $\gamma$-Al$_2$O$_3$. The specific surface area was 79 m$^2$/g (BET one point measurement). The size of the primary particles of Al$_2$O$_3$ powder, determined from raster electron microscopic photographs, was less than 50 nm. The primary particles were grouped into loose agglomerates of <0.2 $\mu$m.

Chemical analysis of the powder showed a Cl content of 0.09% and a C content of 0.1%. The helium density of the powder was 4.1±0.1 g/cm$^3$.

EXAMPLE 2

A mixture of 785 g of furfuryl alcohol and 2 l of chlorobenzene was added dropwise to a solution of 533.4 g of AlCl$_3$, 4 l of chlorobenzene and 300 ml of acetone as in Example 1 and the reaction mixture was then stirred for 2 hours.

After filtration and drying at 300° C., 175.3 g of the powder was annealed in dry air at 1050° C. for 5 hours.

Analysis of the powder showed a C content of 0.065%, a Cl content of 0.013% and an Fe content of <0.005%.

The specific surface area (BET one point measurement) was 62 m$^2$/g. According to X-ray diffraction analysis, the only crystalline phase present was $\alpha$-Al$_2$O$_3$.

EXAMPLE 3

4.9 g of FeCl$_3$ (0.03 mol), 17.0 g of SiCl$_4$ (0.1 mol) and 189.7 g of TiCl$_4$ (1 mol) were added to a solution of 302.7 g of AlCl$_3$ (2.27 mol), 3 l of chlorobenzene and 200 ml of acetone with stirring as in Example 1.

A solution of 323.7 g of furfuryl alcohol (3.3 mol) and 1.5 l of chlorobenzene was added dropwise to the resulting solution and the reaction mixture was then stirred for 2 hours. The solvent was distilled off under vacuum at 130° C.

1260 g of a black, pulverulent polymer having a specific surface area of 13.4 m$^2$/g remained.

616 g of the polymeric intermediate product were uniformly distributed over 7 quartz crucibles for the preparation of aluminium titanate containing additives. The powder was annealed in a chamber furnace for 2 hours in air at 150° C., for one hour at 400° C. and for 12 hours at 900° C. The white-yellow powder obtained was found to weigh 151.2 g.

The X-ray diffraction pattern showed the reflections of the crystalline phases, $\beta$-Al$_2$TiO$_5$, rutile and anatase. The specific surface area (BET one point measurement) of the powder was 105 m$^2$/g. The helium density was 4.06 g/cm$^3$.

What is claimed is:

1. A process for the preparation of finely-divided oxides of metals or metalloids of the elements of group IIIA and IVA and groups IIIB, IVB, VB and VIB of the Periodic System of Elements from compounds or mixtures of compounds having a formula selected from MX$_m$, R$_n$MX$_{m-n}$, or MO$_p$X$_{m-2p}$, wherein M denotes the metal or metalloid, X denotes halogen or an alkoxy group, R denotes hydrogen, alkyl or aryl and n is an integer from 1 to one less than the maximum valency m of the element M, p=1 or 2, and wherein m-2≧1, the process comprising reacting the compounds or mixtures thereof with a reactive, polymerizable, hydrocarbon-containing compound containing a C—OH group, or with a reactive mixture of hydrocarbon-containing, polymerizable compounds one component of which contains a C—OH group to form a polymeric product; and thermally decomposing the resulting polymeric product to form oxides in an oxidizing atmosphere.

2. A process according to claim 1, wherein the reactive mixture contains formaldehyde.

3. A process according to claim 2, wherein the C—OH— containing compound or the C—OH— containing component of the reactive mixture is phenol or a phenol derivative.

4. A process according to claim 1, wherein the reactive, polymerisable, hydrocarbon-containing compound is an alcohol.

5. A process according to claim 4, wherein the alcohol is furfuryl alcohol or derivatives thereof.

6. A process according to claim 1, wherein the metal compound or metalloid compound is selected from one or more compounds of the elements Ti, Hf, Zr, V, Nb, Ta, Cr, Mo or W.

7. A process according to claim 1, wherein the metal compound or metalloid compound is selected from one or more compounds of the elements B, Al or Si.

8. A process according to claim 1 wherein R denotes methyl or phenyl.

9. A process according to claim 1, wherein the reaction is carried out in an organic solvent.

10. A process according to claim 1, wherein the reaction is carried out in the presence of acid.

11. A process according to claim 1, wherein the polymeric product is thermally decomposed at a temperature of up to 2000° C. in an oxidizing atmosphere to produce the oxide.

12. A process according to claim 11, wherein the temperature is about 1200° C.

* * * * *